Patented Dec. 13, 1938

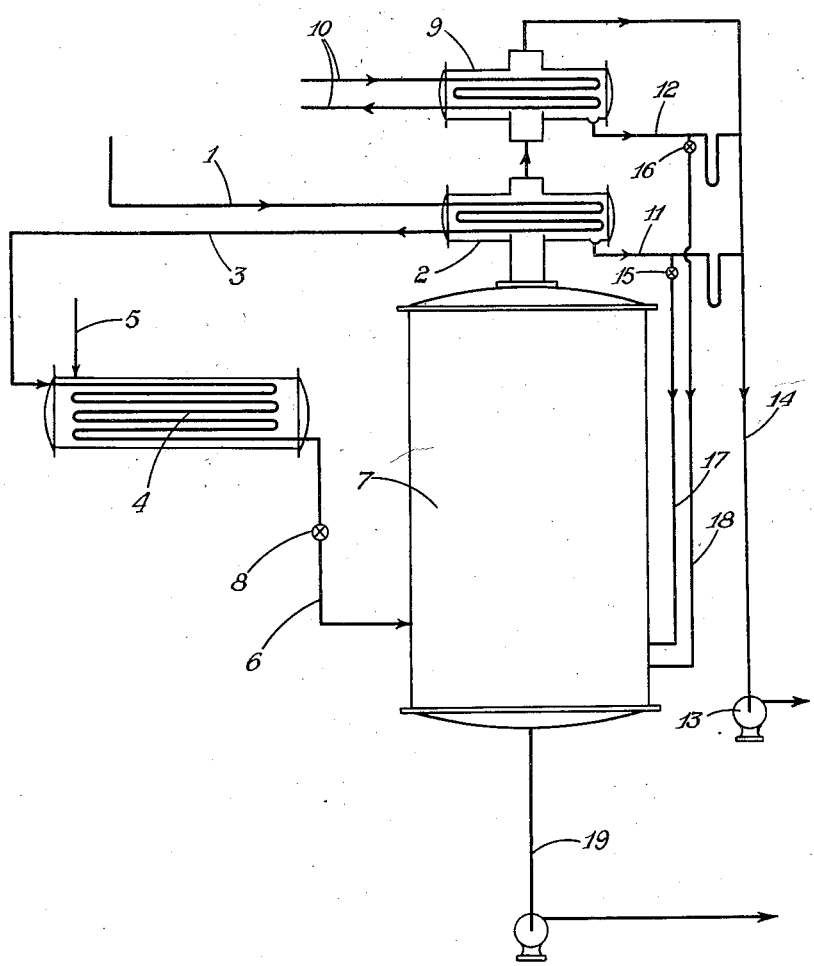

2,140,011

UNITED STATES PATENT OFFICE 2,140,011

PROCESS FOR THE HEAT TREATMENT OF MILK

Verne Hass, Heverle-Louvain, Belgium

Application September 16, 1936, Serial No. 101,012
In Belgium December 24, 1935

2 Claims. (Cl. 99—200)

My present invention relates to a process for the heat treatment of milk with a view to obtaining condensed milk, or sterilized milk, or milk both condensed and sterilized, of superior quality.

In processes used heretofore, the milk to be evaporated is gradually heated while it is circulated to and fro through suitable heaters and receptacles, whereupon it is evaporated under a pressure below atmospheric. After evaporation the milk is subsequently sterilized at approximately 115° C. for 12 to 18 minutes. Such prolonged heating at high temperatures, first while the milk is being circulated and evaporated, then while being sterilized, is injurious to the quality of the condensed milk and affects both its taste and color.

An object of my invention is to overcome these inconveniences and to provide a one pass process wherein the milk is evaporated, and may be sterilized, without recirculating, subsequent reheating, or successive stages of evaporation. It is also an object of my invention to carry out the heating and evaporating operations under such conditions that the milk can be concentrated to the desired extent without being subjected to high temperatures for a time sufficient to impair the quality of the product. A further object of my invention is to provide a process adapted for continuous operation while allowing of constantly controlling the pressure and temperature conditions according to requirements. Still a further object is to make it possible to carry out sterilization at will either simultaneously with or subsequently to the concentration of the milk, and in both cases to avoid prolonged heating such as would be injurious to the taste or the appearance of the final product.

In accordance with my improved process the milk is quickly brought to a temperature somewhat higher than the evaporating temperature while keeping it at a pressure above that prevailing in the evaporator, and then I introduce the hot milk into the evaporator chamber while suddenly releasing its pressure, whereby "flashing", i. e., an instantaneous release of water vapor, takes place. The said vapor is evacuated while the concentrated milk is collected separately.

In carrying out my invention as a continuous process, I feed the milk through a heating coil in which the milk is heated somewhat above evaporating temperature, then through an expansion valve I deliver it under pressure into the evaporator or "flash" chamber, which is of relatively large size. Evaporation may be carried out under any suitable pressure, it being understood that the pressure in the "flash" chamber is always lower than the pressure in the heating coil, apparatus or pipe from which the milk is delivered into said chamber. The water vapor given off in the "flash" chamber may be evacuated or it may be condensed and returned in regulated amounts to said chamber in order to control with accuracy the degree of concentration of the milk.

When evaporating the milk by heating the same according to my process, the taste of the milk is not affected by this heating. If the milk is subsequently sterilized by further heating which is hardly necessary herein, even then it is found to be of a more agreeable taste than milk evaporated by the usual processes.

When carrying out evaporation under pressure as intimated, I may by suitable regulation quickly bring the milk heated under pressure up to a temperature above 115° C., i. e., a temperature sufficient for both evaporation and sterilization, so that after evaporation the concentrated milk is also sterilized and does not require reheating. As this occurs in a single short pass, I obtain a product which is of higher grade than those obtained by the known evaporating and sterilizing processes.

In case it is desired to sterilize the milk without concentrating same, I heat it to the requisite temperature as described above and after "flashing" I incorporate again into the final product the whole or part of the condensate from the previously separated vapors.

Referring now to the accompanying drawing, diagrammatically illustrating a plant embodying my invention, I shall more particularly describe a manner of carrying out my improved process into practice.

The raw milk flows through a pipe 1 into a heat exchanger 2 where it is preheated, thence through a pipe 3 it is led to a coil 4 in which it is quickly heated to the desired high sterilizing temperature, for example by means of steam which may be superheated if required, and is let in at 5. From the heating coil 4 the hot milk flows out through a pipe 6 and an expansion valve or throttle 8 into the evaporator or "flash" chamber 7 in which the pressure is lower than in the coil 4 but still above atmospheric pressure and at sterilizing temperature. By means of valve 8 the flow of milk into the chamber 7 may be so regulated that a spontaneous release of water vapor takes place.

The vapor escapes at the top of chamber 7, flows through the preheater 2 where it heats the raw milk on its way to coil 4, and reaches a condenser 9 cooled by a cold water pipe 10. The condensates collected at 2 and 9 are collected by the pipes 11 and 12 respectively, whereas the uncondensed vapors are sucked by a pump 13 through a pipe 14. The condensates from 11 and 12 may be evacuated through the pipe 14 or they may be led back to the chamber 7 in varying amounts, regulable by valves 15, 16 inserted in return pipes 17, 18 respectively.

The concentrated milk is withdrawn from chamber 7 through pipe 19 and is collected. When coil 4 is kept under pressure at a temperature above 115° C., "flashing" can obviously take place under a pressure equal to or above atmospheric, and the condensed milk is obtained directly in a sterilized condition as the temperature, despite the drop in the flash chamber is in any case yet a sterilizing temperature.

The process can be carried out continuously. Owing to the short time taken up, and that only one rise and subsequent fall of temperature take place, the quality of the milk is preserved to a degree hitherto unattained in condensed milk. It is to be noted that due to the high temperatures of the heating coil 4, pipe 6 and flash chamber 7, these parts are obviously maintained sterile by the heat at all times so that the product is of course sterile, and the whole operation is thus performed throughout in sterile conditions.

It should also be understood that the method of heating and the arrangement of the plant may be varied to suit requirements, without departing from the scope of my invention as defined by the appended claims.

I claim:

1. A one pass process for heat treating milk in sterile conditions throughout the process, which consists in heating the raw milk while in motion to a high sterilizing temperature of above 115° C. at a pressure above the atmospheric, subjecting the heated milk to a sudden drop in pressure to another pressure which is still at least equal to the atmospheric in order to allow the heated milk to expand or flash and simultaneously causing the milk to suffer a drop from said high temperature of above 115° C. to a lower sterilizing temperature so as to cause an instantaneous release of water vapor from said milk and produce sterilized concentrated milk by means of a single rise and subsequent fall of temperature and pressure, separately withdrawing the sterilized concentrated milk and the water vapor, and collecting said sterilized concentrated milk.

2. A one pass process for heat treating milk in sterile conditions throughout the process, which consists in heating the raw milk while in motion to a high sterilizing temperature of above 115° C. at a pressure above the atmospheric, subjecting the heated milk to a sudden drop in pressure to another pressure which is still above the atmospheric in order to allow the heated milk to expand or flash and simultaneously causing the milk to suffer a drop from said high temperature of above 115° C. to a lower sterilizing temperature so as to cause an instantaneous release of water vapor from said milk and produce sterilized concentrated milk by means of a single rise and subsequent fall of temperature and pressure, separately withdrawing the sterilized concentrated milk and the water vapor, and collecting said sterilized concentrated milk.

VERNE HASS.